Dec. 29, 1964    J. H. BRODIE    3,163,380
AIRCRAFT LAUNCHING APPARATUS
Filed June 2, 1961
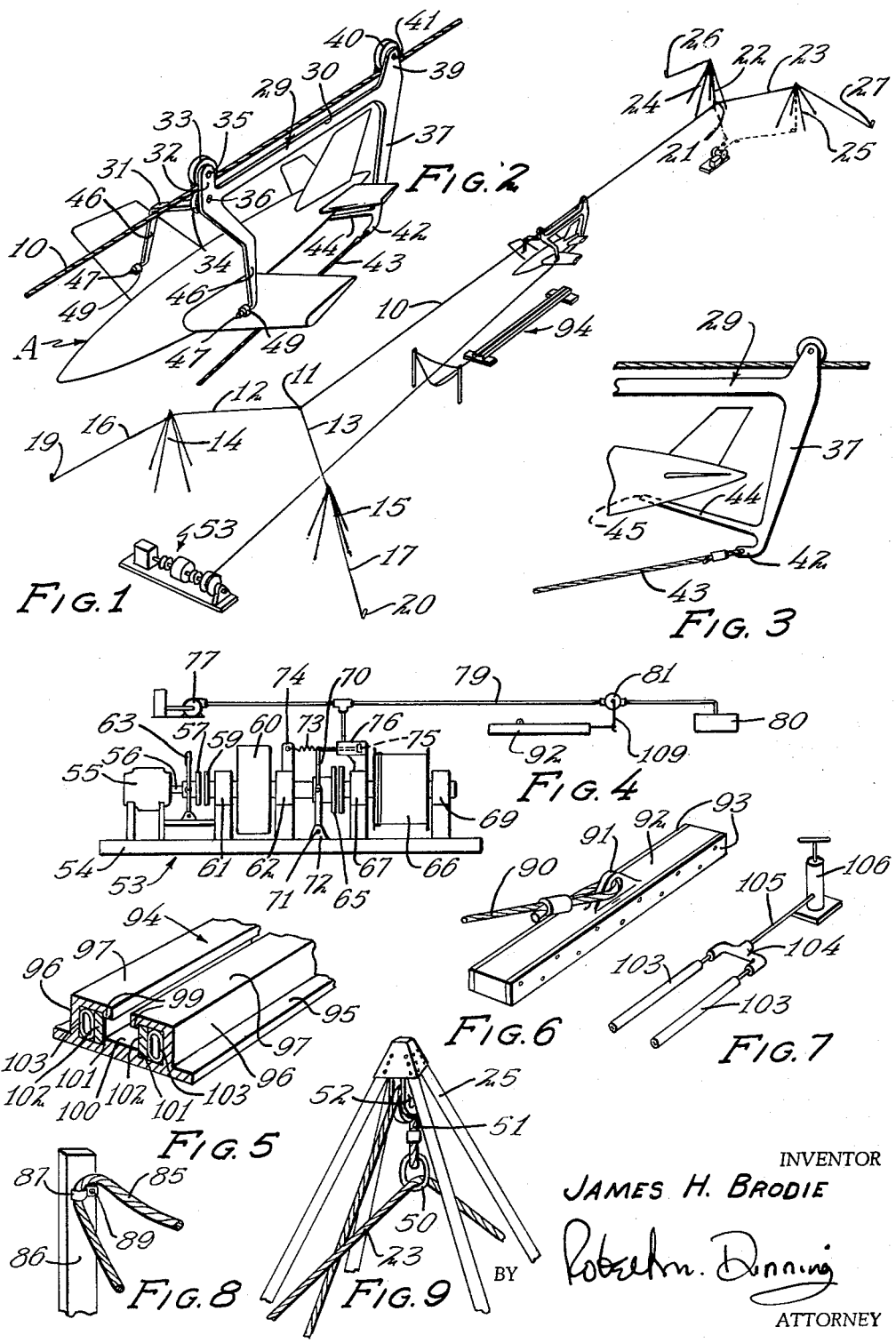
INVENTOR
JAMES H. BRODIE
BY Robert M. Dunning
ATTORNEY Dec. 29, 1964   J. H. BRODIE   3,163,380
AIRCRAFT LAUNCHING APPARATUS
Filed June 2, 1961   2 Sheets-Sheet 2
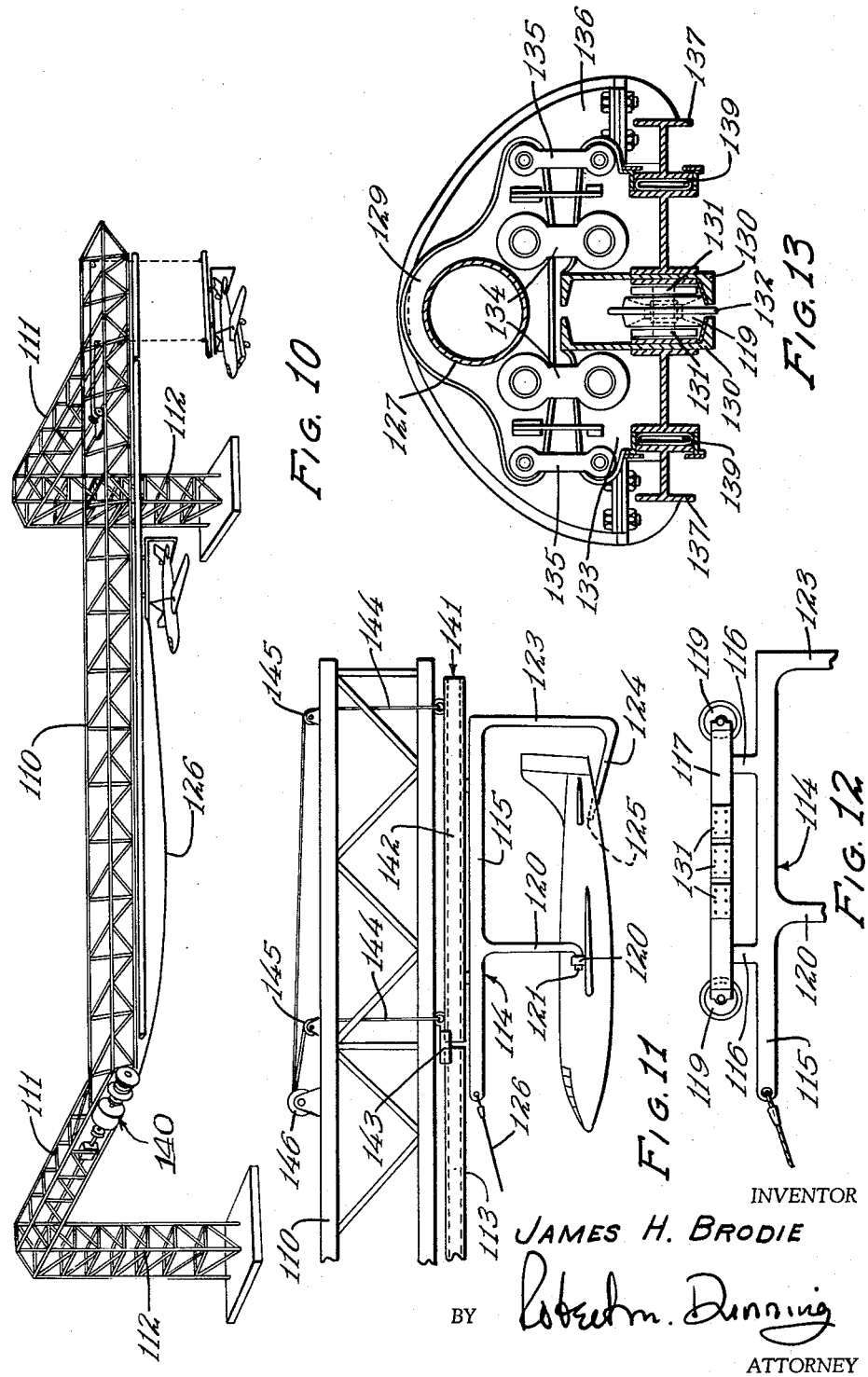
INVENTOR
JAMES H. BRODIE
BY Robert M. Dunning
ATTORNEY 3,163,380
AIRCRAFT LAUNCHING APPARATUS
James H. Brodie, 2258 Fairmount Ave., St. Paul, Minn.
Filed June 2, 1961, Ser. No. 114,514
12 Claims. (Cl. 244—63)

This invention relates to an improvement in aircraft launching apparatus and deals particularly with an apparatus for making possible the launching of an aircraft where a limited runway space is available.

In my previous patent, No 2,435,197, issued February 3, 1948, I disclosed a landing and launching apparatus which included a cable suspended above the ground and supporting a trolley or carriage movable longitudinally of the cable. Means were suspended from the trolley designed to be engaged by a hook or fixture on the aircraft so that the aircraft moved the trolley from one end of the cable toward the other end thereof. A movement arresting cable was connected to the trolley and was wound upon a drum and brake assembly so that the movement of the trolley and the aircraft suspended therefrom could be gradually arrested during the movement of the trolley.

The patent also disclosed a type of trolley which could be employed for permitting launching of an aircraft. However, in this arrangement, it was necessary for the airplane to gain the necessary flying speed by its own power. The trolley was held from movement at one end of the supporting cable until the aircraft propeller developed the necessary thrust to start the plane in motion quickly and the plane moved the trolley along the length of the cable until it obtained the necessary speed to maintain flight at which time connection with the trolley was released.

In another patent, No. 2,488,051, issued November 15, 1949, I disclosed a modified form of aircraft landing apparatus which was designed for mounting on shipboard and constructed to take the place of a landing strip on an aircraft carrier. This patent also disclosed an overhead track including a trolley and a means suspended from the trolley designed to engage a cooperable hook extending upwardly from the aircraft. This patent also disclosed a means of retarding the movement of the trolley as it was moved along the track by the aircraft so that the plane could be landed in a minimum length of space.

An object of the present invention resides in incorporating in these previous structures and apparatus for assisting the launching of the aircraft in the nature of a catapult device. The catapult device is preferably mounted at one end of the overhead track and is connected in a suitable manner to the trolley. Through the operation of the catapult device, the speed of movement of the plane is quickly accelerated so that the plane is capable of obtaining flying speed in a short period of time.

A feature of the present invention resides in the provision of a catapult device which includes a motor or drive mechanism, a flywheel, and a cable wheel or drum. The flywheel is connected to the drive motor through a clutch, and is connected to the winding drum through a second clutch. In operation, the flywheel is connected to the drive motor and disconnected from the winding drum until the flywheel rotates at a desired speed of rotation. The clutch connecting the flywheel to the drive motor is then released and the clutch connecting the flywheel to the winding drum is connected, the kinetic energy stored in the flywheel winding the tow cable upon the winding drum at an accelerating rate and thus moving the aircraft along the track at an accelerating rate of speed.

A further feature of the present invention resides in the provision of an apparatus of the type described including means for lifting and lowering the aircraft from the overhead track. When a rigid overhead track is employed, a section of the track supporting the trolley is supported for vertical movement. By locating the aircraft supporting trolley in the movable section of track, the track section, trolley and aircraft may be lowered to the ground. The aircraft may be lifted in a similar manner by connecting the trolley on the lowered section of track to the aircraft, and raising the track section until it is aligned with the remainder of the track.

A further feature of the present invention resides in the provision of a novel means of disconnecting the trolley from the plane as the plane approaches the end of the supporting track or cable. Where the trolley is supported for movement over the ground, the catapult device may be mounted on the ground near the end of the supporting cable and the tow rope connecting the catapult device to the trolley may extend through a loop supported upon the ground beneath the level of the aircraft. The carriage includes a downwardly extending arm at the rear of the plane which extends below the level of the aircraft and to which the tow cable is attached. The loop supported upon the ground is connected to a decelerating means which reduces the speed of movement of the trolley and finally brings it to a stop. As the tow cable extends through the loop, the loop is effectively guided into engagement with the lower end of the downwardly projecting arm of the trolley to arrest the movement of the trolley. The trolley is connected to the plane in such a way as to become automatically detached from the trolley as soon as the speed of the trolley is reduced below that of the plane.

These and other objects and novel features of the present invention will be more clearly and fully set forth in the following specification and claims.

In the drawings forming a part of the specification:

FIGURE 1 is a diagrammatic view of the general arrangement of the aircraft launching apparatus.

FIGURE 2 is a diagrammatic perspective view showing the cable supported trolley and indicating diagrammatically an airplane supported thereby.

FIGURE 3 is a side elevational view of the rear portion of the plane supporting trolley showing the downwardly projecting arm to which the tow cable is attached.

FIGURE 4 is an elevational view of the catapult apparatus.

FIGURE 5 is a perspective view showing in section a portion of the trolley-decelerating apparatus.

FIGURE 6 is a perspective view of the movable portion of the trolley-decelerating apparatus used in conjunction with the track illustrated in FIGURE 5.

FIGURE 7 is a diagrammatic view showing the manner in which the frictional engagement between the slidable block of the trolley-decelerating apparatus and the track is applied.

FIGURE 8 illustrates diagrammatically a manner in which the plane engaging loop is supported.

FIGURE 9 is a diagrammatic view showing the upper portion of one of the cable supporting towers showing the manner in which the cable may be raised and lowered to raise and lower the aircraft.

FIGURE 10 is a diagrammatic perspective view showing a modified form of landing and launching apparatus.

FIGURE 11 is a diagrammatic side elevational view of an end of the track illustrated in FIGURE 10, showing the manner in which the aircraft may be raised and lowered.

FIGURE 12 is a side elevational view of the upper portion of the plane supporting trolley removed from the tracks.

FIGURE 13 is a transverse sectional view through an end of the track showing the manner in which the trolley is decelerated.

The general arrangement of the launching track illustrated in FIGURE 1 of the drawings is similar to that illustrated in my previous Patent, 2,435,197, previously referred to. In general, the structure includes a runway cable 10 connected at one end 11 to diverging cables 12 and 13 which are pivotally supported to spaced towers 14 and 15 respectively. The ends 16 and 17 of the diverging cables 12 and 13 are adjustably anchored to the ground as indicated at 19 and 20 respectively.

The towers 14 and 15 are spaced apart a distance sufficient to provide a clear passage for the aircraft therebetween. Furthermore, the towers are of sufficient height to maintain the aircraft above the ground level throughout its length of travel along the runway cable 10 despite the inevitable sag of the runway cable intermediate the ends thereof.

The other end 21 of the cable 10 is similarly supported by diverging cable portions 22 and 23 which are supported by upright towers 24 and 25 respectively. The ends of the cable portions 22 and 23 are anchored to the ground as indicated at 26 and 27.

A trolley which is indicated in general by the numeral 29 is designed to move longitudinally of the cable 10, and this trolley is designed to support an aircraft which is indicated in general by the letter A. In the particular form of construction illustrated, the trolley 29 includes a longitudinally extending beam 30 having at its opposite ends aircraft supporting means. A transverse bifurcated support 31 is provided at the forward end of the trolley 29 and terminates in an upward projection 32 including spaced upper and lower grooved rollers 33 and 34 which are properly spaced to accommodate the cable 10 therebetween. The rollers 33 and 34 are mounted on spaced transverse axes 35 and 36 which are spaced apart a distance sufficient to permit the cable to move readily therebetween while at the same time to prevent the escape of the cables between the rollers.

The rear end of the trolley 29 is provided with a downwardly projecting arm 37 having an upwardly extending projection 39 which may also serve as a support for a grooved roller 40 mounted upon a transverse axis 41. As indicated in FIGURE 3 of the drawing, the arm 37 is provided with a forwardly extending hook shaped end 42 to which the tow cable 43 may be attached by suitable means. The lower end of the arm 37 is also provided with a forwardly and upwardly extending thrust shaft 44 preferably designed to engage in a socket 45 in the under-surface of the aircraft A so as to exert a force against the aircraft. The aircraft A is supported by the spaced downwardly extending arms 46 of the yoke 31. The lower ends of these arms 46 are provided with parallel forwardly extending ends 47 which are designed to extend through loops 49 mounted on the wings of the plane or at any other suitable point. The yoke 31 supports the plane while the thrust shaft 44 holds the rear end of the plane in proper relation to the other end thereof. Due to the manner in which the plane is supported, the aircraft may separate from the trolley at any time when the speed of the plane exceeds the speed of the trolley.

One manner in which the aircraft A may be engaged in, or disengaged from, the trolley 29 and may be raised or lowered from the runway cable 10 is diagrammatically illustrated in FIGURE 9 of the drawings. This figure illustrates the upper end of one of the towers supporting the runway cable, such as the tower 25, and shows the cable portion 23 which extends from the end 21 of the runway cable to the anchor point 27 supported by an eye 50 encircling the cable portion 23 and connected to a cable 51 supported by a block 52, the cable 51 extending to a suitable fixed winch or other such means. By tightening the cable 51, the cable portions 23 may be raised to elevate the runway cable 10. Both of the cable portions such as 22 and 23 at one end of the cable 10 may be similarly supported so that the corresponding end of the runway cable 10 may be raised and lowered by the hoisting cables 51.

The catapult device indicated in general by the numeral 53 forms a very important part of the present apparatus, and in the arrangement illustrated, this catapult device 53 is mounted on the ground beyond the end 11 of the cable 10 and substantially on a vertical plane through the cable 10. The catapult device 53 includes a base 54 to which the various elements are secured. The catapult includes a suitable motor 55 which is designed to drive a shaft 56 connected by a clutch 57 to the shaft 59 of a flywheel 60. The flywheel shaft 57 is supported by bearings in the bearing supports 61 and 62 on opposite sides of the flywheel. The clutch 57 is indicated as having a manual shifting means 63 by means of which the clutch 57 may be engaged or disengaged. Obviously, this clutch may be pneumatically or hydraulically or electrically engaged if it is so desired, the particular arrangement illustrated being shown merely for the purpose of illustration.

A clutch 65 is designed to connect the flywheel 60 with the winding wheel or drum 66. The clutch 65 may be of any type which permits slippage between the drive member and the driven member but which resists such slippage. In other words, the clutch 65 tends to drive the wheel 66 at the same speed as the flywheel 60, but some slippage takes place between the two members to permit the trolley to be accelerated from a stopped position to a relatively high speed motion. The tow cable 43 is anchored to the drum 66 and is wound thereon as the aircraft is accelerated. The winding drum 66 is supported by bearings in the bearing supports 67 and 69 mounted on opposite sides of the drum.

While the mechanism illustrated is purely for the purpose of illustration, the clutch 65 is indicated as a friction disk clutch operated by a lever 70 pivotally connected at 71 to a bracket 72 on the base 54. The clutch 65 is normally urged into open or disengaged position by a spring 73. The spring 73 is connected between the upper end of the lever 70 and a fixed bracket 74. The lever 70 may be moved into closed or engaged position by means of a piston 75 in a cylinder 76 which is supplied with fluid from a pump 77 or other fluid supply means. Means are provided for preventing the pump from building up undue pressure within the cylinder 76. However, when the pump 77 is in operation fluid may flow either into the cylinder 76 or to the line 79 leading to a discharge reservoir 80. The discharge line 79 is controlled by a valve 81. When the valve 81 is open, the fluid will flow from the pump and from the cylinder 76 to the reservoir 80. However when the valve 81 is closed, all of the fluid from the pump 77 which is not recirculated due to an increase in pressure, it is directed to the cylinder 76.

The clutch 65 is manually or mechanically closed to start the winding reel 66 in operation, but the clutch is opened or disengaged by operation of the valve 81 when the trolley 29 approaches the end of the runway cable 10 in a manner later described.

In the operation of the catapult device 53, the clutch 65 is maintained in disengaged position and the clutch 57 is engaged. The motor 55 is started and rotates the flywheel 60, gradually accelerating the speed of the flywheel until a predetermined maximum speed is reached. In order to launch the aircraft the clutch 63 is disengaged and the clutch 65 is engaged in any suitable manner, such as starting the pump 77 or by closing the valve 81. As the clutch 65 closes, the kinetic energy stored in the flywheel 60 acts to start rotation of the winding drum 66, exerting a pull upon the tow cable 43 and accordingly accelerating the speed of the trolley 29 from stand-still to the speed of rotation of the flywheel 60. As will be understood, the rotative force acting upon the winding drum is supplemented by the thrust of the engine or engines of the plane.

As the trolley nears the end of the runway, means are provided for decelerating the trolley, and this means also acts in a manner which will be described to open the valve 81, thus disengaging the clutch 65. As a result, the means decelerating the movement of the trolley acts only upon the rotative force of the winding drum, and the flywheel 60 may continue to rotate until it is stopped by the friction of the supporting bearings or by external brake means if preferred.

The apparatus for decelerating the trolley is actuated by engagement of the aircraft A with a flexible loop 85 supported by a pair of uprights 86 mounted on opposite sides of the path of movement of the tow cable 43. As indicated in FIGURE 8 of the drawings, the uprights 86 are provided with spring clips 87 which are anchored at one end as indicated at 89 to the upright and which merely hold the loop 85 clamped to the upright. As is indicated in FIGURE 1 of the drawings, the tow cable 43 extends through the loop 85. The loop 85 is designed for engagement with the hook shaped lower end 42 of the arm 37 of the trolley 29 and the insertion of the tow cable through the loop insures the proper guidance of the loop into the hook end of the trolley. As is diagrammatically shown in FIGURE 1 the bottom of the loop 85 is connected by a connecting cable 90 to the fastening means 91 on the top of a friction block 92 indicated in FIGURE 6 of the drawings. The friction block 92 may have replaceable friction plates 93 on opposite side walls thereof.

A track 94 is indicated in FIGURE 5 of the drawings in which the friction block 92 is longitudinally slidable. The track 94 includes a base plate 95 which is secured to the surface of the ground in any suitable manner. The track includes a pair of upright track sides 96 which support a pair of inwardly extending top flanges 97 which are arranged on a common plane parallel to the base plate 95. The inwardly extending flanges 97 may terminate in short downwardly extending flanges 99. A portion 100 extending along the transverse center of the base plate 95 is thickened to provide shoulders 101 which are in opposed relation to the inner edges of the flanges 99.

Bearing plates 102 are supported outwardly of the flanges 99 and the opposed shoulders 101. Elongated inflatable tubes 103 are interposed between the bearing plates 102 and the track sides 96. The bearing plates 102 are engageable against the opposite sides of the friction block 92 and the friction with which these bearing plates engage the bearing block 92 depends upon the pressure expanding the inflatable tubes 103.

FIGURE 7 diagrammatically illustrates the inflatable tubes 103 connected to a common manifold 104, and connected by conduit 105 to a source of pressure 106. This figure is merely for the purpose of illustration. The frictional force may be gradually applied or may be applied at the start of the launching operation.

In the operation of this device, as the trolley 29 approaches the end of the runway cable, the loop 85 is engaged in the hook end 42 on the trolley 29. As a result, further movement of the trolley causes the friction block 92 to move longitudinally of the track. Movement of the friction block is resisted by pressure against the sides of the block by the bearing plates 102 and the movement of the trolley is decelerated at a desired speed.

As the trolley decelerates, the aircraft A continues its onward movement.

As indicated in FIGURE 4 of the drawings, the friction block 92 is connected by any suitable means such as the connector 109 to the valve 81 so that as the friction block 92 starts its movement along the track 94, the valve 81 is opened, releasing the pressure applied to close the clutch 65 and permitting the spring 73 to immediately open this clutch thereby disconnecting the flywheel from the winding drum 66.

FIGURES 10-13 of the drawings show a modified form of construction having certain features of similarity to the structure previously shown in Patent 2,488,051 which was previously referred to. In the drawings, the structure is shown being mounted on the ground rather than upon an aircraft carrier as in the previous patent. The device includes an elongated rigid frame which is supported by laterally extending supporting arms 111 on standards 112, a number of such standards being sufficient to support the weight of the track and the plane detachably supported thereupon. In general, the elongated frame 110 supports a track 113 which is generally similar to that shown in my previous patent. As indicated in FIGURES 11 and 12, a trolley 114 is supported by the track 113 for movement longitudinally thereof. The trolley 114 includes a beam 115 which is supported beneath the level of track 113 by two or more spaced supporting arms 116 securing the beam 115 in spaced parallel relation beneath the trolley body 117. The trolley 117 is supported by rollers 119. The beam 114 rigidly supports a yoke 120 having forwardly extending arms 121 at its lower end which engage in loops 122 or other suitable fixtures on the wings of the aircraft B. The beam 115 is provided at one end with a downwardly projecting arm 123 including at its lower end a forwardly and upwardly inclined supporting arm 124 which engages in a socket 125 in the under surface of the aircraft B. A tow cable 126 is connected to the forward end of the beam 115 to move trolley 114 longitudinally of the track 113.

As indicated in FIGURE 13 of the drawings, the elongated frame 110 includes a main frame 127. The main frame member supports a series of spaced track support members 129 which support a pair of opposed channel-shaped brackets 130 through a parallel linkage mechanism so that the sides of the track may be forced together to apply a braking force to the replaceable brake shoes 131 on the sides of the trolley member 117. The trolley rollers 119 are preferably provided with a central flange 132 which extends through the space between the opposed channels 130 to hold the trolley centered. Brackets 133 are attached to the channels 130 to extend outwardly therefrom at intervals, and the brackets 133 are supported by the track support brackets 129 by a pair of inner links 134 and a pair of outer links 135, the links being of similar length and pivotally connected at their upper ends to the track support brackets 129 and at their lower ends to the track brackets 133. The axes of all the pivots are parallel and the structure is such that the channels 130 may be moved toward or away from one another the extent necessary to apply friction to the trolley.

Intermediate between the track support brackets 129 backing support brackets 136 are provided and are connected by elongated beams or plates 137. Expandable means 139 are supported between the backing plates or beams 137 and the brackets 133 to exert a braking pressure force against the trolley. In view of the fact that this type of construction is indicated in detail in my previous Patent 2,488,051, the structure is not described in great detail.

The catapult device 140 identical to the previously described catapult device 53 is mounted at one end of the elongated frame 110 and controls the tow cable 126.

The only difference is between the catapult 53 and 140 lies in the location and mounting of the device.

As indicated in FIGURE 11 of the drawings, the end of the frame 110 opposite that supporting the catapult device 140 includes a track section 141 which is aligned with the track 113 and which includes a pair of opposed channels 132 secured in fixed relation and into which the trolley 114 may move when at the end of the track. Bracket means 133 of any suitable types may be secured to extend from the end of the track 113 to insure the proper alignment of the track section 141 with the track 113. The ends of the track section 141 are supported by hoist cables 144 which are guided over parallel sheaves 145 to a winch or hoisting drum 146. The winding drum 146 is operated by a suitable motor, not illustrated, to raise and lower the track section 141 and the trolley 114 supported thereby. With this arrangement, a plane such as B may be lifted from the ground and aligned with the supporting track 113 for the launching operation. The tow cable 126 may be attached while the trolley is lowered if desired and will be in readiness for the launching operation. Similarly, an airplane which has just landed may be lowered to the ground.

In the present application, the apparatus used to launch the aircraft is not shown in detail, as this would be similar to that shown in the previous patent. The operation of the apparatus is similar to that previously described. The tow cable is connected to the trolley and the catapult 140 is operated as in the structure shown in FIGURES 1–9. As the trolley approaches the end of the track 113, a braking pressure is applied to the friction plates 131 of the trolley, and the plane leaves the trolley and is airborne. Simultaneously with the application of braking pressure to the trolley, the clutch connecting the flywheel to the winding drum is disengaged, permitting the trolley to be brought to a stop. The means for disengaging the clutch 65 may be tied in with the means for applying braking pressure to the trolley. For example, in place of closing the valve by means of the shuttle or friction block 92, as in FIGURE 4, the valve 89 may be opened by an air cylinder connected to the valve and communicating with the air line connected to the inflatable tubes 103. Thus when braking pressure is applied to the trolley, the flywheel 60 is disengaged from the winding drum through opening of the valve 81.

In accordance with the patent statutes, I have described the principles of construction and operation of my improvement in aircraft launching apparatus, and while I have endeavored to set forth the best embodiment thereof, I desire to have it understood that changes may be made within the scope of the following claims without departing from the spirit of my invention.

I claim:

1. An aircraft launching device including an elevated runway track supported in a generally horizontal position, a trolley supported by said track for longitudinal movement thereon, an aircraft supporting means on said trolley and extending downwardly therefrom and releasably connected to said aircraft below the trolley, a catapult device at one end of said track and including a tow cable connected to said trolley, a retarder supported beneath said track adjoining said end of said track for movement generally parallel to said track, and a flexible connector connected to said retarder and including an upwardly extending loop in the path of movement of said trolley as it approaches said one end of said track, and means on said trolley engageable with said loop to actuate said retarder.

2. The structure of claim 1 and in which said tow cable extends through said loop.

3. An aircraft launching apparatus including an elongated runway cable, a pair of diverging cable portions at each end of said runway cable, a pair of spaced towers at each end of said runway cable over which said cable portions extend, anchoring means outwardly of said towers to which the ends of said cable portions are secured and means secured to the top of the towers at one end of said runway cable and slidably connected to the corresponding cable portions at the bight of the cable for raising and lowering said cable portions from said towers.

4. The structure of claim 3 and in which said means secured to the top of the towers includes pulley means and a hoisting cable extending therethrough.

5. In an aircraft launching apparatus an elongated frame supported in elevated position above the ground, a track supported by said frame and extending longitudinally thereof, a trolley supported by said track and movable longitudinally thereof, an aircraft supporting means on said trolley and extending downwardly therefrom for releasably supporting an aircraft for movement with said trolley, and a track section at one end of said track movable vertically into and out of alignment with said track, said track section being adapted to accommodate said trolley, and means for raising and lowering said track section and trolley thereupon.

6. The structure of claim 5 and including means cooperable between said track and track section for holding the same in alignment.

7. An aircraft launching apparatus for catapulting an aircraft into flight from a hanging position, including an elevated trackway positioned in a generally horizontal straight direction, means structurally supporting said trackway, a wheeled cradle supported by said trackway and movable longitudinally thereupon, said cradle being suspended below said trackway, means on said cradle adapted for attachment with an airplane to support the same in a hanging position in fixed alignment underneath said cradle and parallel to said elevated trackway, an accelerating engine at the extremity of said trackway comprising a driving power source coupled to a cable drum to force said cable drum to rotate, a tow cable having one end connected to said wheeled cradle and the other end secured to, and wound upon said cable drum, control means for actuating said driving power to said cable drum and means for arresting said wheeled cradle near one end of said elevated trackway.

8. The structure of claim 7 and in which said accelerating engine includes a flywheel, an energy absorbing coupling and said cable drum all in direct alignment, said energy absorbing clutch coupling acting to apply a constant torque and allowing slippage between the rotation of the flywheel and the rotation of said cable drum with a speed differential varying from maximum to minimum as the cable drum accelerates from zero to maximum speed.

9. The structure of claim 7 and in which said means for arresting said wheeled cradle is located on the ground below, and generally parallel to said trackway.

10. An aircraft launching apparatus for catapulting an airplane into flight, including an elevated trackway positioned in a generally horizontal straight direction, means structurally supporting said trackway, a wheeled cradle supported on said trackway and movable longitudinally thereupon, said cradle being suspended below said trackway, means on said cradle adapted for detachable connection with an airplane to support the airplane in a hanging position in fixed alignment beneath said cradle and parallel to said elevated trackway, a portion of said trolley adapted to lie to the rear of said airplane in its launching process extending below the level of the airplane when attached to said trolley, an accelerating engine at the extremity of said trackway, and coupled to a cable drum, and a tow cable having one end secured to said downwardly extending portion of said cradle near the lower extremity thereof and having its other end connected to, and wound around, said cable drum.

11. The structure of claim 10 and including a cradle arresting means beneath said trackway near said one end thereof, and a loop flexibly connected to said arresting means and supported in the path of said downwardly extending portion of said cradle.

12. The structure of claim 11 and in which said tow cable extends through said loop.

References Cited in the file of this patent

UNITED STATES PATENTS

| | | |
|---|---|---|
| 1,415,847 | Sperry | May 9, 1922 |
| 1,912,723 | Perkins | June 6, 1933 |
| 2,390,677 | Alkan et al. | Dec. 11, 1945 |
| 2,435,197 | Brodie | Feb. 3, 1948 |
| 2,894,606 | Bless | July 14, 1959 |
| 2,928,503 | Bless | Mar. 15, 1960 |
| 3,022,027 | Keahey | Feb. 20, 1962 |

FOREIGN PATENTS

| | | |
|---|---|---|
| 3,182 | France | Feb. 6, 1914 |